United States Patent [19]
Reider et al.

[11] Patent Number: 5,685,729
[45] Date of Patent: Nov. 11, 1997

[54] ELECTRICAL CONNECTOR AND VENT TUBE ASSEMBLY WITH CONNECTOR POSITION ASSURANCE

[75] Inventors: Christopher George Reider, Boardman; Randy Lynn Fink, Warren, both of Ohio

[73] Assignee: General Motors Corporation, Detroit, Mich.

[21] Appl. No.: 460,337

[22] Filed: Jun. 2, 1995

[51] Int. Cl.$^6$ ..................................................... H01R 4/64
[52] U.S. Cl. ........................................... 439/206; 439/79
[58] Field of Search ........................... 439/79, 274, 275, 439/277, 205, 206, 532, 540.1, 595, 701, 352, 620, 76.1

[56] References Cited

U.S. PATENT DOCUMENTS

| | | | |
|---|---|---|---|
| 4,123,131 | 10/1978 | Pearce, Jr. et al. | 439/206 |
| 4,230,392 | 10/1980 | Leonard, Jr. et al. | 439/206 |
| 4,963,103 | 10/1990 | Fink et al. | 439/352 |
| 5,252,092 | 10/1993 | Reider et al. | 439/595 |
| 5,496,184 | 3/1996 | Garrett et al. | 439/79 |
| 5,509,825 | 4/1996 | Reider et al. | 439/620 |

OTHER PUBLICATIONS

Prior art description on pages 1 and 2 of the instant application (H-170678).

*Primary Examiner*—P. Austin Bradley
*Assistant Examiner*—Brian J. Biggi
*Attorney, Agent, or Firm*—Cary W. Brooks; William A. Schuetz

[57] ABSTRACT

An electrical connector assembly for a wiring harness and connectable to a control module includes a vent tube for venting the interior of the control module. The connector assembly includes an end cap retainer that assures that both electrical terminals of the connector assembly and the vent tube are properly seated in the connector body of the connector assembly.

5 Claims, 4 Drawing Sheets

ELECTRICAL CONNECTOR AND VENT TUBE ASSEMBLY WITH CONNECTOR POSITION ASSURANCE

The present invention relates to an electrical connector assembly and, more particularly, to an electrical connector assembly for a wiring harness and vent tube in which an end cap retainer assures that both the electrical terminals and a vent tube connected to the connector body are properly seated in the connector body.

BACKGROUND OF THE INVENTION

Antilock braking systems for automotive vehicles employ a control module which is housed in an aluminum housing usually located in the engine compartment of the vehicle. These control modules include a printed circuit board having header connectors mounted thereto. The housing adjacent the header connectors has openings through which mating connector bodies of wiring harnesses connected to the antilock braking system can pass to mate with the header connectors. Suitable seals are provided to seal off the housing interior from the ambient atmosphere in the engine compartment.

However, since pressure builds up inside the aluminum housing due to thermal cycling of the ABS system, a vent tube assembly is provided for venting the interior of the aluminum housing to the passenger compartment. The vent tube was a small diameter tube having a female electrical socket terminal crimped thereto to enable it to be inserted into an existing cavity in the mating connector body of the wiring harness and connected thereto. The terminal is needed both to connect the tube to the connector body and to enable a presence check for the tube to be made when the wiring harness is checked.

The use of these prior art vent tube assemblies had the drawback that the vent tube had to be of a small diameter which thus restricted air flow, even though the small diameter tube was connected to a larger tube outside the connector body via a coupler. It also took up one of the cavities so that one less electrical circuit could be made. It further required multiple parts and assembly time which was costly.

SUMMARY OF THE PRESENT INVENTION

In accordance with the provisions of the present invention, an antilock braking system (ABS) control module has an aluminum housing provided with a sealing shroud surrounding a pair of openings and which houses a printed circuit board having a pair of header connectors mounted thereto and facing the openings in the housing. One of the header connectors has male terminals, preferably male blade terminals, for power functions and the other connector has male terminals, preferably pin terminals, for electrical signal functions.

Connected to the aluminum housing and the header connectors is a wiring harness and vent tube connector assembly. The connector assembly comprises a main body connector having a first projecting body portion carrying female terminals for power functions for mating with the header connector male blade terminals and a second projecting body portion carrying socket terminals for signal functions for mating with the header connector male pin terminals and an integral peripheral shroud carrying a seal for receiving the shroud of the housing and for sealing against its forwardly facing edge.

The connector assembly also has a rigid strain relief body connected to the main connector body for conducting wires connected to the female socket terminals which provide electrical signal functions. The connector assembly further carries a bolt for bolting the connector assembly directly to the aluminum housing and has a slide cover provided with a side opening so that the electrical signal wire conductors have to be bent at right angles to provide additional strain relief.

An important feature of the present invention is that a separate vent tube cavity is provided in one of the projecting body portions of the main body connector and the strain relief body to enable a fairly large diameter vent tube to be inserted therethrough for venting the interior of the aluminum housing to the passenger compartment. The vent tube has a radially outwardly extending ring of a given outer transverse dimension or diameter adjacent its forward end which defines a radially extending abutment surface facing rearwardly thereof and the vent tube cavity in the main connector body is defined by spaced wall surfaces which face toward each other. A pair of spaced deflectable cantilever lock arms are integral with the wall surfaces and each has an inwardly extending abutment defining a forwardly facing abutment surface so that when the arms are in their free state position, they spaced apart a distance which is less than the given diameter of the ring of the vent tube. The ring of the vent tube causes the lock arms to be deflected away from their normal free state position and each other when the vent tube is inserted into the connector body from its rearward end to its forward end until the ring clears the abutments on the lock arms whereupon the lock arms return to their normal free state position to position the abutments thereof behind the abutment surface of the ring of the vent tube to prevent reverse movement. A retainer cap having a vent opening aligned with the vent tube in the connector body is provided for retaining the vent tube against forward movement when connected to the connector body. The retainer cap also has a pair of laterally spaced, rearwardly extending projections which are received between the wall surfaces of the vent tube cavity and the lock arms if the vent tube has been properly connected to the connector body to prevent deflection of the lock arms. The projections on the retainer cap are engageable with the lock arms at their forward ends if the lock arms are still deflected as a result of the engagement between the ring of the vent tube and the abutments of the lock arm. This assures that the vent tube has been properly connected to the connector body.

Another feature of the present invention is that the end cap also provides a terminal position assurance for the terminals in the signal function projecting body portion of the connector assembly.

Another feature of the present invention is that by bolting the connector assembly directly to the aluminum housing all stress is placed on the aluminum housing as opposed to being bolted directly to the header connector. This enables small header connectors to be used and simplifies circuit board and header assembly.

Yet another feature is that the shroud on the header housing has a pair of ribs which are pressed against the seal carried by the shroud of the main body connector of the connector assembly and causes the seal to displace into a groove between the ribs to provide a tight seal.

A further feature is that the signal function conductor wires pass through small holes in a seal and through holes in the strain relief body so that the conductor wires must pass through the seal at right angles to the plane of the seal prior to being bent and thereby insuring proper sealing and strain relief for the conductor wires.

A still further feature is that the additional strain relief is provided by a slide cover having a side opening so that the signal function wire conductors have to be bent at right angles to pass through the side opening of the cover.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which.

Figure 1:
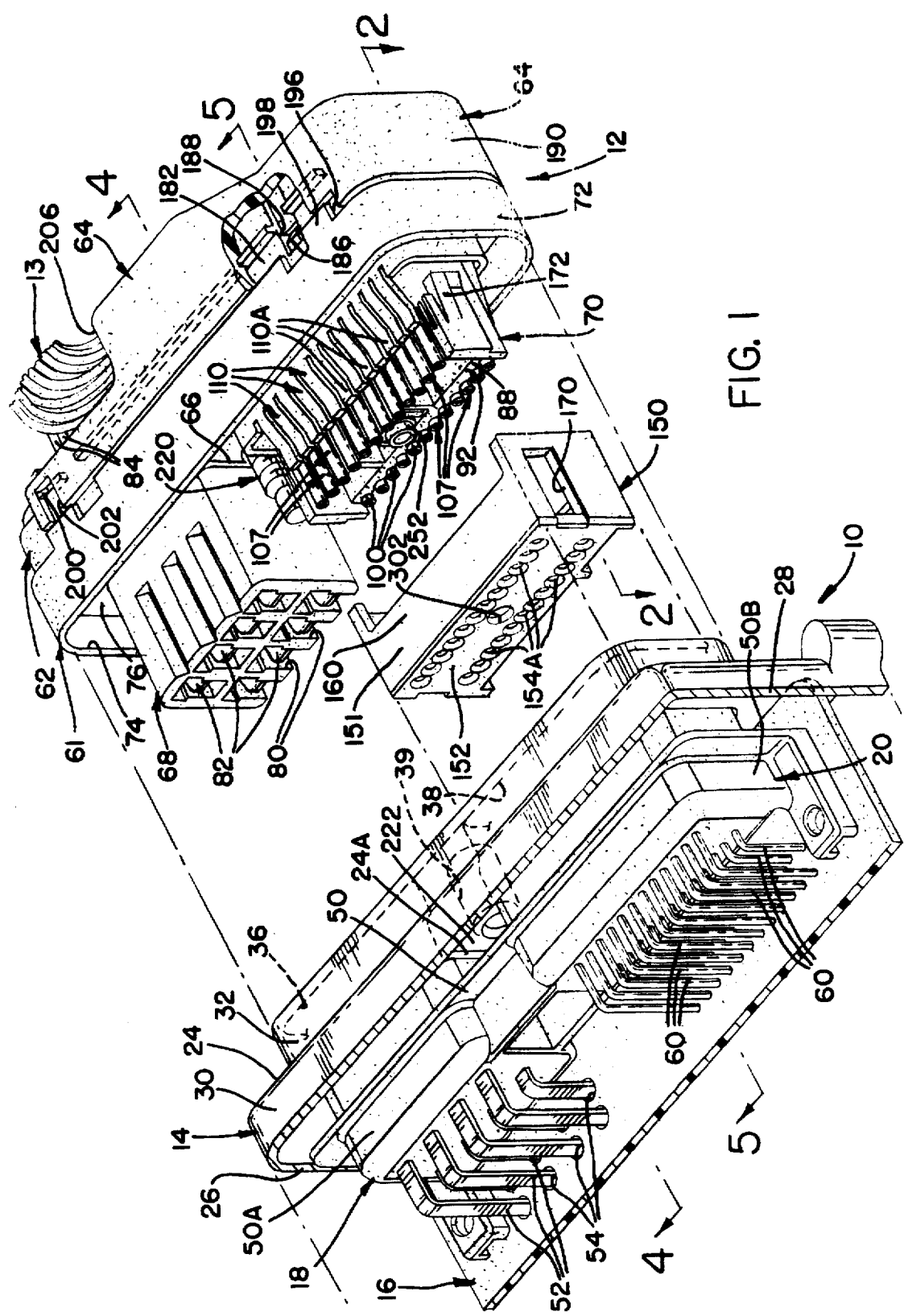
FIG. 1 is an exploded, fragmentary perspective view of the novel electrical connector assembly and electronic module having an aluminum housing and a circuit board provided with header connectors.
Figure 4:
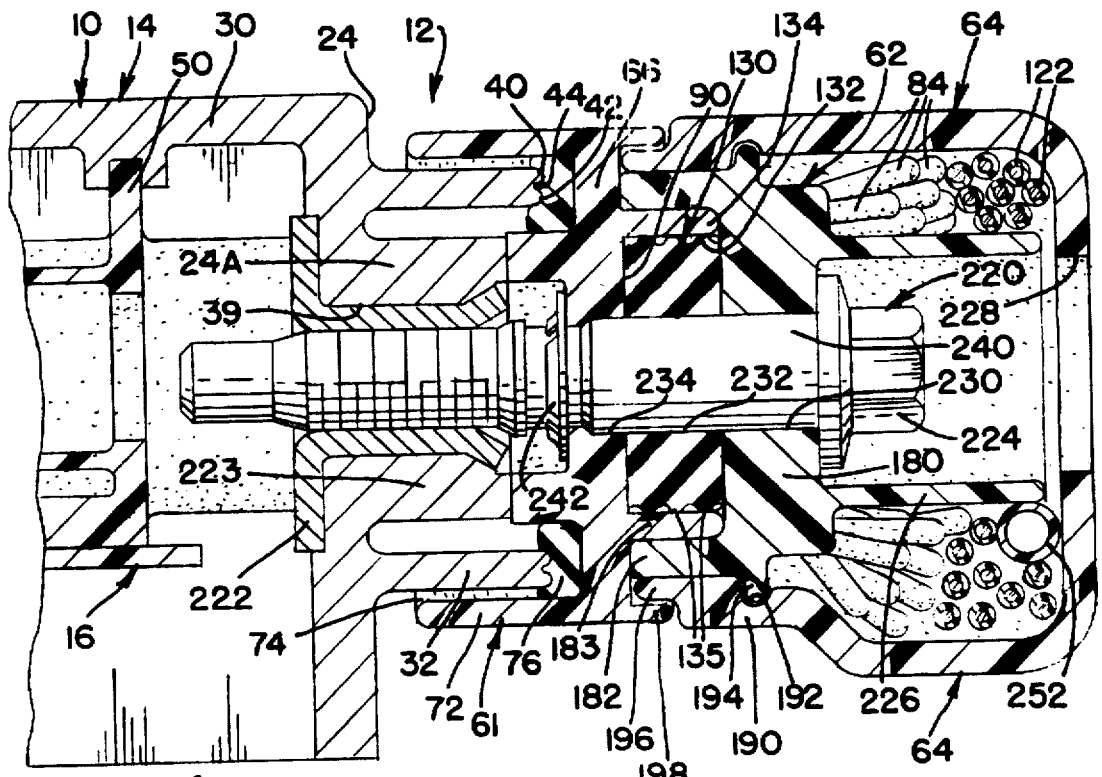
FIG. 4 is an enlarged, fragmentary sectional view taken approximately along line 4—4 of FIG. 1 and showing the parts all connected together.

Referring to FIGS. 1 and 4 of the drawings, an electronic control module 10 and an electrical connector assembly 12 for a wiring harness 13 are thereshown. The control module 10 comprises an aluminum housing 14 which houses a printed circuit board 16 and a pair of header connectors 18 and 20 connected to the printed circuit board adjacent one edge thereof.

The aluminum housing 14 is die cast aluminum and includes a forward end wall 24, a pair of side walls 26, 28, a rear end wall (not shown) and a top wall 30. The housing 14 has an open bottom to enable the printed circuit board 16 and header connectors to be inserted into the housing 14 and suitably secured within the housing in any suitable manner, such as by bolting thereto.

Integral with the forward wall 24 is a rectangularly shaped forwardly facing shroud 32 which surrounds a pair of openings 36, 38 in the wall 24 and which are aligned with the header connectors 18, 20, respectively. The openings 36, 38 are separated by a wall portion 24A of the forward wall. The wall portion 24A has a central through opening 39 to enable a bolt to pass therethrough, and in a manner hereinafter more fully described. As best shown in FIG. 4, the shroud 32 terminates in a forwardly facing end defined by a pair of spaced, peripherally extending ribs 40, 42. The ribs 40, 42 define a groove 44 therebetween.

The printed circuit board 16 would comprise a plurality of printed circuits having various electronic devices mounted thereon. It includes the header connectors 18 and 20. The header connectors 18, 20 preferably have one main connector body 50 defining spaced body portions 50A, 50B. The connector body portion 50A of the header connector 18 includes a plurality of male blade terminals 52 which are suitably secured within the connector body portion 50A adjacent one end and have their other ends extend through openings 54 in the printed circuit board 16 and soldered to printed circuits on the underside of the board 16. The header connector 18 and the male blade terminals 52 could be of any suitable or conventional construction.

The connector body portion 50B of the header connector 20 includes a plurality of male pin terminals 60 having one end secured within the connector body and its other end extending through openings in the printed circuit board 16 and soldered to various printed circuit pads on the underside of the board 16. The header connector 20 also could be of any suitable or conventional construction. The main connector body 50 of the header connectors 18, 20 is suitably either snap fittingly connected to the printed circuit board 16 or could be bolted thereto and when positioned within the housing 14 the male blade terminals 52 and the pin terminals 60 face the openings 36, 38 in the front wall 24. The male blade terminals 52 are adapted to be connected with power function circuits and the male pin terminals 60 are adapted to be connected to signal function circuits of the ABS control module 10.

Referring to FIGS. 1 and 4, the electrical connector assembly 12 is part of a wiring harness 13 and is connectable to the header connectors 18, 20 and to the housing 14. The electrical connector assembly 12 comprises a main connector body 61, a strain relief connector body 62 and a slidable cover 64.

The main connector body 61 comprises a one piece molded plastic connector body having a base 66, a first projecting body portion 68, a second projecting body portion 70 laterally spaced from the first connector body portion 68 and a shroud 72. The shroud 72 extends perpendicularly from the base 66 and defines with the projecting connector bodies 68, 70 a rectangularly shaped recess or groove 74. A rectangularly shaped, peripherally extending planar seal 76 is received in the recess 74 and positioned against the base or bottom 66, and for a reason to be hereinafter more fully described.

The forwardly projecting body portion 68 is integral with the base 66 and has a plurality of cavities 80 extending therethrough from the rearward end of the base 66 through its forward end. Housed in each of the cavities 80 is a suitable or conventional box terminal 82, which is crimped onto electrical conductors 84. The terminals 82 could be of any suitable or conventional construction for receiving the male blade terminals 52 and would be locked in place within the cavities 80 in any suitable manner as is well known in the art. The conductors 84 would be connected with power sources or functions and the conductors 84 would carry individual circular seals (not shown) for engaging a circular wall portion of the cavity 80 adjacent its rearward end (not shown) and in a manner well know to those skilled in the art. A terminal position assurance member (not shown) would be positioned behind the seals carried by the wires 84 to hold the seals in sealing engagement with the walls defining the cavities 80 of the projecting body portion 68.

Figure 5:
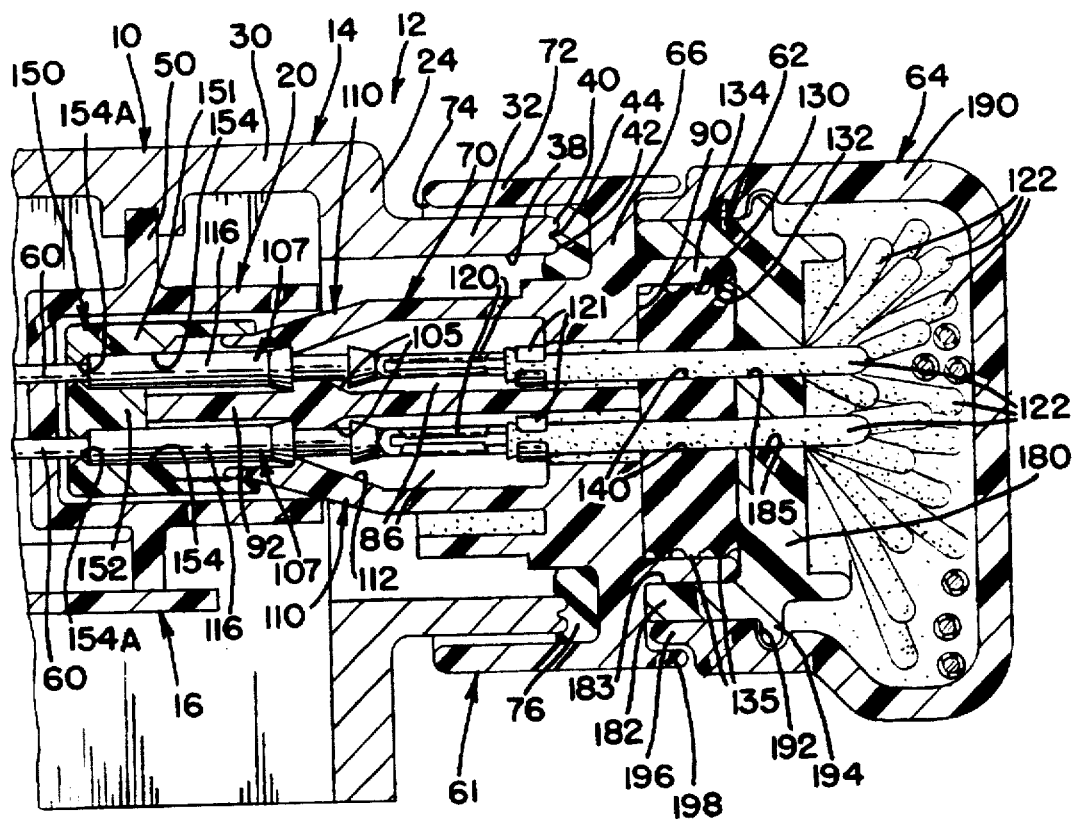
FIG. 5 is an enlarged fragmentary, cross sectional view taken approximately along lines 5—5 of FIG. 1.
Figure 6:
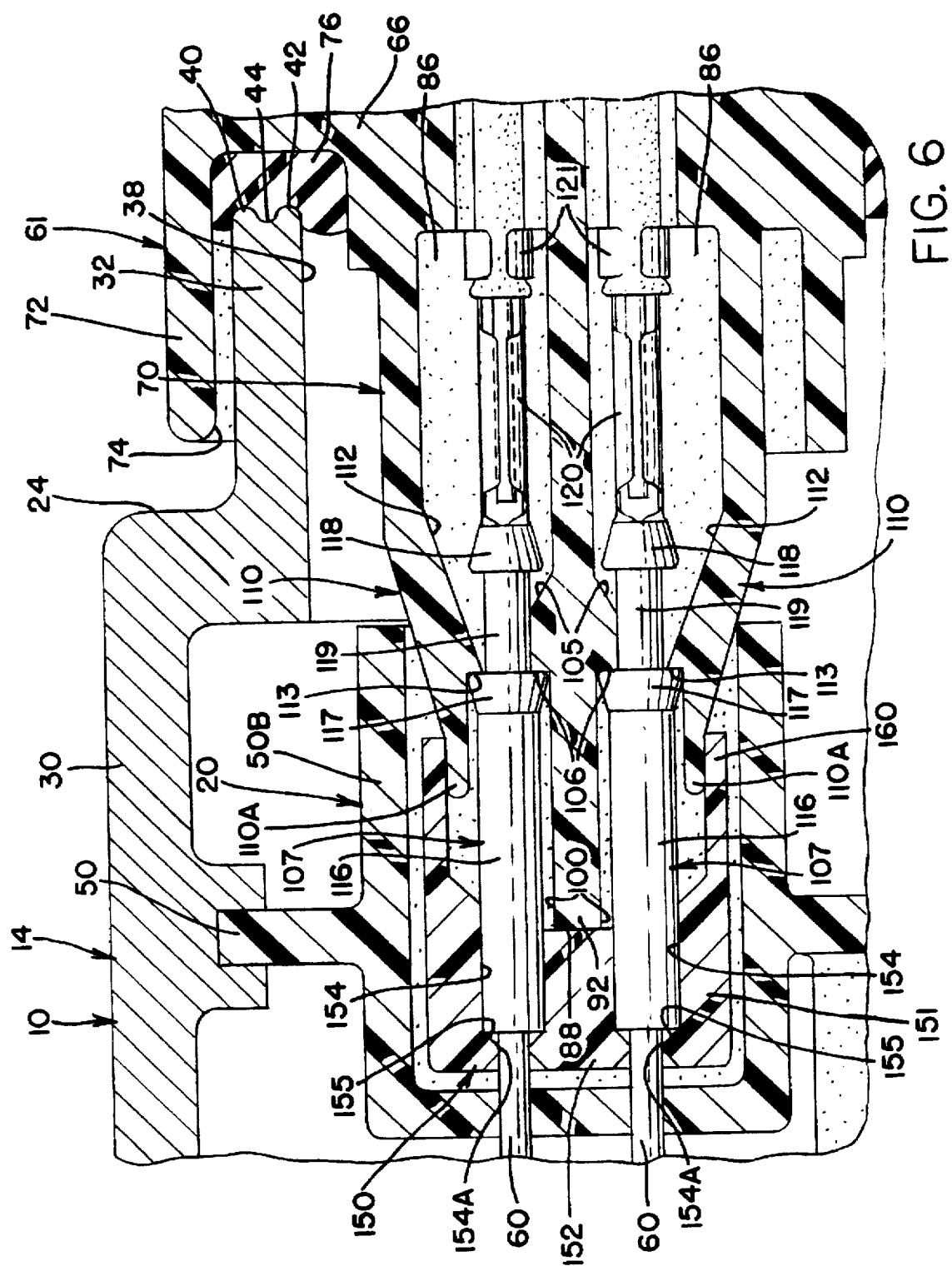
FIG. 6 is an enlarged sectional view of part of the connector assembly shown in FIG. 5.

The projecting body portion 70 is integral with the base 66 of the main body connector 61 and has a plurality of terminal cavities 86 which extend axially through the connector body 61 from a forward contact end 88 to a rearward conductor end 90. The cavities 86 are located side by side and form two vertically spaced rows, an upper row and a lower row, as best shown in FIGS. 1 and 5. The projecting body portion 70 has a nose or forward portion 92 of reduced height which terminates at the contact end 88. The nose portion 92 comprises a plurality of transversely spaced, upwardly and downwardly facing ribs which define side by side channels 100. The channels 100 each comprise a forward portion of the terminal cavity 86 and have open sides. Integral with the side wall defining the cavities 86 and extending radially inwardly of the channels 100 are tapered ramps 105 which terminate in radially extending shoulders 106 for retaining terminals 107 in the channels 100.

The connector main body 61 is also provided with a plurality of individual deflectable cantilever arms 110. The arms 110 are integral with the rearward portion of the connector body 61 and each overlies one of the channels 100. The arms 110, in effect, form outer walls for the axially extending rearward portion of the channels 100. The arms 110 each have a rearward portion which tapers toward the nose portion 92 defining the channels 100 and a free end portion 110A which extends parallel to the channels 100. The arms 110 are also provided with underlocks defined by inwardly extending ramps 112, which terminate in a radially extending shoulder 113. The ramps 112 are located directly opposite the ramps 105 of the shoulder 106 and lie in the same plane as the shoulders 106 of the ramp 105, which plane is normal to the longitudinal axis of the connector body 61.

The arms 110 have a normal free state position, as shown in FIG. 5, but can be deflected outwardly away from the channels 100 to deflected positions. The arms 110 are deflected from their normal position to an outer position by the terminals 107 when the latter are inserted in the cavities 86 until the terminals lock behind the shoulders 113, 106. The arms 110 when deflected will snap return to their normal free state position and provide an audible click to apprise the operator that the terminals have been properly seated.

One of the terminals 107 is disposed in each terminal cavity 86. The terminals 107 are socket type terminals of a conventional and well known construction. Suffice it to say that each of the metal terminals 107 has a tubular receptacle or cylinder 116 at its forward end and a pair of spaced lands 117, 118 intermediate its opposite ends which define a radially extending groove 119 therebetween and conventional crimp wings 120, 121 which are crimped onto the bare conductor and insulated conductor sheaths respectively of conductor wires 122.

The main connector body 61 also carries an elastomeric seal 130, which is preferably made of a silicone rubber and is seated in a rearwardly facing channel 132 defined by a rectangularly shaped shroud 134 integral with the base 66 of the main connector body 61. The seal 130 has a plurality of axially spaced, circumferentially extending ribs 135 which slidably and sealingly engage the shroud 134 along its inner wall surface. The seal 130 seats against the base 66. The seal 130 also has a plurality of spaced openings 140 for sealingly engaging the wire conductors 122.

The terminals 107 are connected to the projecting portion 70 of the main connector body 61 by inserting the same from right to left, as viewed in FIG. 5. The terminals 107 can be pushed through the openings 140 in the seal 130 and into the cavities 86. The land 117 will engage the deflectable arm 110 to cause the same to be deflected outwardly until it clears the abutments 106, 113 whereupon the arms 110 will snap back to their normal position. The terminal can then be pulled backwards from left to right to seat the land 117 against the abutments 106, 113 in the forward or nose portion 92 and the arms 110.

The main connector body 61 also includes an end cap 150 which slides over the forward end 92 of the projecting body portion 70 and serves to retain the terminals 107 in place on the connector body portion 61 and prevent the same from being moved forwardly or toward the left, as viewed in FIG. 5. The end cap 150 is U-shaped in cross section to define an annular or peripherally extending wall 151 and a forward end wall 152. The forward end wall 152 has a plurality of apertures 154 therethrough which are aligned with the channels 100 at the forward end portion 92 of the projecting body portion 70. The apertures 154 slidably receive the cylindrical forward ends of the terminals 107. The forward end wall 152 defining the apertures 154 includes a tapered, lesser diameter opening portions 154A to provide a radial abutments 155 against which the forward ends of the terminals 107 can abut. Each abutment 155 is also defined by a tapered entry opening through which a mating pin terminal is slidably guided into the cylindrical end of the socket terminals 107.

Figure 2:
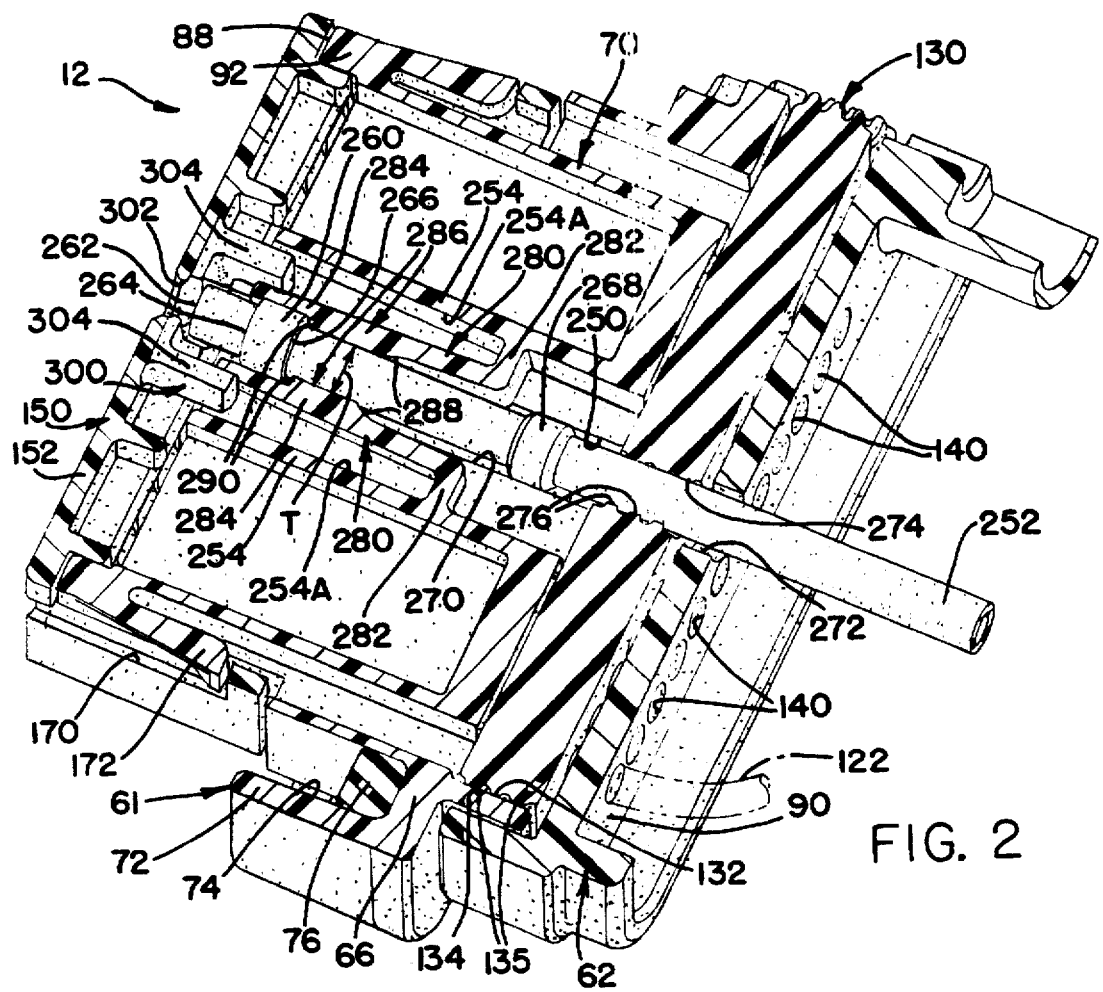
FIG. 2 is an enlarged, fragmentary sectional view taken approximately along the lines 2—2 of FIG. 1.

As best shown in FIG. 5, the end cap also on its peripherally extending wall 151 has a reduced thickness portion 160 at its rearward end which slidably receives the forward portions 110A of the flexible arms 110 of the projecting body portion 70. As best shown in FIGS. 1 and 2, the sides of the end cap includes slots 170 and the projecting body portion 70 includes a flexible side latch arms or fingers 172. The end cap 150 when positioned over the forward end 92 of the connector body 61 engages the flexible arms 172 to cause the same to be deflected towards each other until the end cap 150 passes by the arms 172 whereupon the arms 172 return to their normal free state position by moving into the slots 170 to latch the end cap 150 in place.

When all of the terminals 107 are inserted in their respective terminal cavities 86, the end cap 150 is mounted and retained on the nose portion 92 of the connector body portion 70, as shown in FIG. 5. If all the terminals 107 are properly seated, the end cap 150 will slide freely thereon and with its rearward portion 160 sliding over the forward portions 110A of the deflectable arms 110. This prevents the flexible arms 110 from being flexed radially outwardly and also positions the terminals for reception of the mating pin terminals 60 of the mating header connector 20.

It should be noted, however, that if one or more of the terminals 107 has not been properly inserted all the way into the connector body, the end cap 150 cannot be assembled to the projecting body portion 70. If one of the flexible arms 110 is deflected outwardly and rests on a land 117 or a forward portion of the socket terminal 107, the end cap 150 will abut at flexible arm 110 and be prevented from being fully seated onto the projecting body portion 70. The assembler would then have to properly seat that terminal 107. Additionally, if the end cap 150 is forced onto the projecting body portion 70 the out of position arm 110 will pop up and slide over the top of the end cap 150 and thus, provide a visual indication that something is wrong and that one of the terminals 107 has not been properly seated in its terminal cavity 86. Thus, the end cap 150 also functions as a terminal position assurance (TPA) member.

The strain relief connector 62 is molded from a much harder plastic material than the main body connector 61 and is shaped complementary to the main connector body portion 61, as shown in FIG. 1. As best shown in FIGS. 4 and 5, the strain relief connector 62 includes a base 180 and a forwardly extending shroud 182 defining a rectangularly shaped recess 183 which receives the rearwardly projecting shroud 134 on the main connector body 61. The strain relief connector has a plurality of openings (not shown) through its base 180 which receive the conductors 84 and a plurality of openings 185 which are aligned with the openings 140 in the seal 130 through which the conductors 122 extend.

The strain relief connector 62 is snap fittingly connected to the main connector body 61. To this end, connector body 61 has two laterally spaced barbed tangs 186 (only one of which is shown in FIG. 1 of the drawings) at its top and bottom sides and the strain relief has matching openings 188 in its shroud 182. The strain relief connector 62 is connected to the main connector body 61 by pushing the shroud 182 thereof over the tangs 186 until the tangs 186 are aligned with the openings 188 whereupon they will snap to the openings 188 to secure the strain relief connector 62 to the main connector body 61.

The openings 185 in the base 180 of the strain relief connector 62 through which the conductors 122 pass serve an important strain relief function in that they assure that each of the conductors 122 passing through the seals 130 are aligned with the openings 140 in the seals 130, i.e. in that they extend at right angles to the plane of the seal 130. This prevents any of the wires 122 from being bent so as to come through the seal 130 at a slant so that leakage through the openings 140 could occur.

The conductor wires 122 passing through the strain relief connector 62 are adapted to be bent at right angles and be contained in that position by the slidable cover 64. The slidable cover 64 is generally U-shaped and is adapted to be slidably connected to the strain relief connector 62. To this end, the cover 64 along its side walls 190 on its interior side defines a pair of grooves 192 which enable it to be slidably connected to a pair of longitudinally extending rails 194 extending laterally outwardly of the strain relief connector 62. In addition, the side walls 190 of the cover 64 terminate in flanges 196 which are slidably received between the shroud 182 of the strain relief connector 62 and a rearwardly extending flange or rail 198 of the main body connector 61, as best shown in FIG. 4. Thus, the cover 64 can be connected to the strain relief connector 62 by aligning the flanges 196 underneath the rails 198 and the grooves 192 with the rails 194 and then merely sliding the same from right to left, as viewed in FIG. 1.

The cover 64 is held in place on the strain relief connector 62 via a snap fit. To this end, the strain relief connector has a pair of tapered ramps 200 (see FIG. 1) extending laterally thereof which are adapted to be received in a pair of notches 202 in the side wall of the cover 64 to lock the same in place. The cover 64 rides over the tapered ramps 200 until the notches 202 in the cover 64 are aligned therewith and then the cover 64 snaps back over the ramps 200. The provision of the cover 64 holds the wire conductors 122 which were bent at right angles in place, the conductors 122 extending outwardly through a side or lateral opening 206 in the cover 64 as shown in FIG. 1. The cover 64 thus provides further strain relief for the wire conductors 122.

The electrical connector assembly 12 is connected to the header connectors 18, 20 and the aluminum housing 14 by a bolt 220 and a T-nut 222. The T-nut 222 is secured to a boss 223 integral with the housing wall 24 and extends through the opening 39 therein in any suitable manner (see FIG. 4). The bolt 220 has a head 224 which is housed in an integral, rearwardly extending tower 226 of the strain relief connector 62, which tower 226 is also aligned with an opening 228 in the top of the cover 64 to permit a tool to be inserted therethrough. The bolt 220 extends through aligned openings 230, 232, 234 in the strain relief connector 62, the seal 130 and the main connector body 61, respectively. The bolt 220 has a shank portion 240 which sealingly engages the seal 130 and the bolt 220 is rotatable relative to the strain relief connector 62 and the main connector body 61, but held against axial movement by a suitable retainer snap ring 242 which is received in a radially extending groove in the bolt 220. The bolt 220 at its forward end is threaded so that it can threadably engage the T-nut 222 mounted on the housing wall 24.

The connector assembly 12 is aligned with the header connector or housings 18, 20 so that the pin terminals 60 mate with the socket terminals 107 and blade terminals 52 mate with the box terminals 82 and then the bolt 220 is turned to the tighten the same against the aluminum housing 14, as shown in FIG. 4. It should be noted that the seal 76 is compressed when the connector assembly 12 is secured to the aluminum housing 14 and that the seal 76 is received within the annular groove 44 to provide a good tight seal between the connector assembly 12 and the aluminum housing 14.

Figure 3:
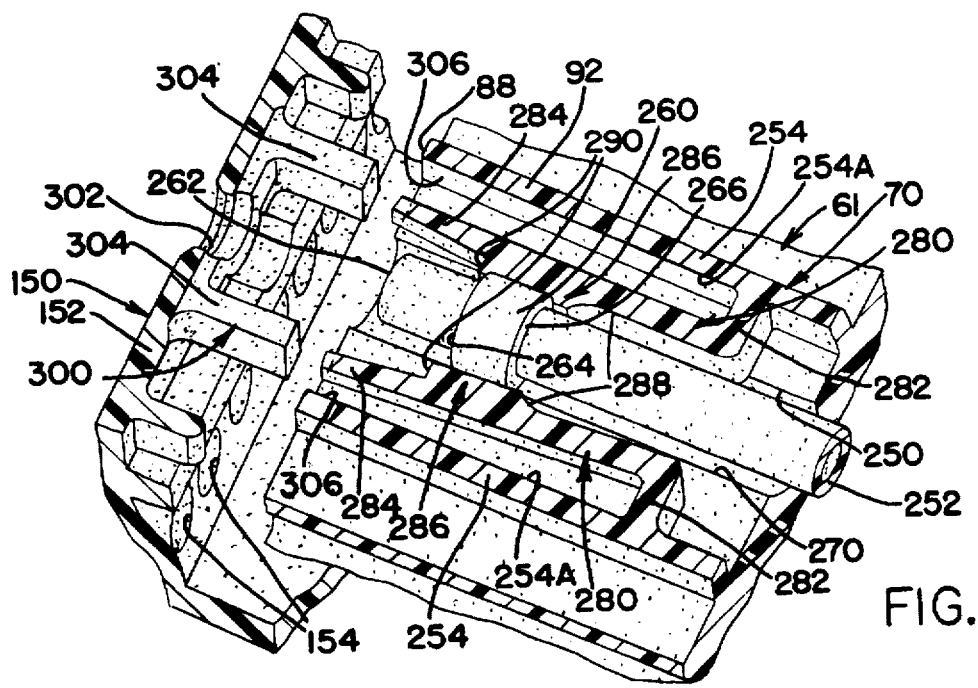
FIG. 3 is an enlarged, fragmentary perspective view like that shown in FIG. 2, but showing different parts thereof in different positions.

An important feature of the present invention is that the body portion 70 of the main connector body 61 also has a central through cavity 250 between the rows of terminals 107 for receiving a vent tube 252. As best shown in FIGS. 1–3, the cavity 250 is located midway between the lateral sides of the projecting body portion 70 and is defined by a pair of spaced side walls 254 integral with the forward or nose portions 92 of the body portion 70. The vent tube 252 is made from a suitable plastic or rubber material and is of a size such that it can readily vent the interior of the housing 14 to the passenger compartment of the vehicle. The vent tube 252 has an integral, enlarged ring or collar 260 spaced slightly inwardly from or adjacent to its forward end 262. The ring 260 defines a pair of radially extending abutments 264, 266 which face forwardly and rearwardly of the vent tube, respectively. The vent tube 252 also has a second ring or collar portion 268 spaced further inwardly from its forward end which is slidably received in grooves 270 formed in the forwardly extending portions 92 of the body portion 70. The second collar 268 serves to guide and retain the vent tube 252 in its proper position when connected to the connector body 61. As best shown in FIG. 2, the vent tube extends through aligned openings 272, 274 in the strain relief connector 62 and the seal 130, respectively, and which are aligned with the central cavity 250 for the vent tube 252. The seal 130 includes a plurality of annular ribs 276 for sealingly engaging the exterior of the vent tube to provide a good seal.

The spaced side walls 254 have interior wall surfaces 254A which face each other. Integrally formed with the side walls are a pair of cantilever, deflectable lock arms 280. Each of the lock arms 280 has a first portion 282 which extends normal or transversely of its adjacent side wall and a deflectable forward arm portion 284 which is angled toward the vent tube, as viewed in FIG. 2. The lock arms each have an abutment 286. The abutment has a tapered ramp surface 288 facing rearwardly and a radially extending abutment surface 290 facing forwardly toward the forward end 262 of the vent tube 252. The transverse dimension T between the abutments 286 when the lock arms 280 are in their normal free state position is less than the diameter of the forward collar or ring 260 and approximately the same as the diameter of the vent tube 252.

The vent tube 252 is connected to the electrical connector assembly 12 by inserting the same from right to left as viewed in FIG. 2. With the cover 64 removed, the vent tube 252 can be pushed through the aligned openings 272, 274 and 250 in the strain relief connector 62, seal 130 and cavity 250. When the vent tube 252 is received within the cavity 250, the collar 260 will ride within the grooves 270 until it engages the tapered surfaces 288 of the abutments 286 on the lock arms 280. The collar 260 will then cause the lock arms 280, upon further movement, to be deflected away from each other until the collar 260 clears the abutments 286 whereupon the lock arms 280 due to their inherent self biasing forces will return to their normal free state position and position the forwardly facing abutments 290 behind the abutments 286 on the collar 260 of the vent tube 252 to lock the vent tube 252 in position on the connector body 61. The second collar 268, due to its being received within the grooves 270, prevents lateral shifting of the vent tube 252 when connected. It should also be noted that the opening 272 in the strain relief connector 62 prevents the vent tube 252 from passing through the seal 130 other than at right angles through the plane of the seal 130 and thus, provides a good seal for the vent tube 252. The vent tube 252 is then adapted to be bent and positioned along with the conductor wires 84 so as to pass out the side opening 206 in the cover 64 when the cover 64 is slidably connected to the strain relief connector 62.

It should be noted that the end cap 150 has a vent tube connector position assurance means 300 for ensuring that the vent tube 252 has been properly connected and positioned within the body portion 70 of the connector body 61. As best shown in FIGS. 2 and 3, the end cap is provided with an opening 302 which is located adjacent the forward end 262 of the vent tube 252 to provide a vent path from the interior of the housing 14 to the vent tube. Also, the end cap 150 has a pair of rearwardly extending projections 304 on opposite sides of the opening 302. If the vent tube 252 has been properly connected to connector body portion 70, as shown in FIG. 2, the end cap 150, when positioned over the forward end 92 of the connector body 61, will provide an assurance of that proper connection. This is because the two projections 304 which straddle the lock arms 280 will be received within the spaces 306 between the lock arms and the side walls 254 to enable the end cap 150 to be connected to the connector body portion 70, as shown in FIG. 2. These two projections 304 also prevent the lock arms 280 from being deflected away from each other and thus, serve to lock the lock arms 280 in place and the vent tube 252 to the connector body portion 70.

However, if the vent tube 252 is not properly connected to the connector body, as shown in FIG. 3, the collar 260 due to its engagement with the abutments 286 will hold the lock arms 280 in their outer deflected position. In this position, when the end cap 150 is positioned over the forward end 92 of the connector body portion 70, the protrusions 304 will engage the forward ends of the lock arms 280 and prevent the end cap 150 from being connected. When this occurs, the operator will first have to properly connect the vent tube 252 prior to reconnecting the end cap 150.

From the foregoing, it should be readily apparent that a novel connector and vent tube assembly has been provided and in which the vent tube has its own cavity in a connector body and in which an end cap serves a dual purpose of preventing forward movement of both a plurality of electrical connectors and a vent tube and also serves as a terminal position assurance and vent tube position assurance means simultaneously.

Although the illustrated embodiment hereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. An electrical connector assembly for a wiring harness which is adapted to be connected to a header connector on a printed board contained in a housing having an opening through which the electrical connector assembly extends, the electrical connector assembly comprising a connector body having forward and rearward ends and a plurality of through cavities for receiving metal terminals connected to conductor wires and with the terminals being positioned adjacent the forward end of the connector body, a retainer cap connected to the connector body and extending over the forward end thereof for retaining said metal terminals against forward movement, and a vent tube extending through a cavity in the connector body for venting the housing interior containing the printed circuit board to ambient atmosphere, the improvement being that the vent tube has a radially outwardly extending ring of a given outer transverse dimension adjacent its forward end which defines a radially extending abutment facing rearwardly thereof and said vent tube cavity in said connector body is defined by spaced wall surfaces which face each other, a pair of spaced, deflectable cantilever lock arms integral with the wall surfaces and each having an inwardly extending abutment defining a forwardly facing abutment surface, said abutments, when the arms are in their free state position, being spaced apart a distance which is less than the given transverse dimension of said ring of said vent tube, said ring of said vent tube causing said lock arms to be deflected away from their normal free state position and each other when the vent tube is inserted into the connector body from its rearward end to its forward end until the ring clears the abutments on said lock arms whereupon the lock arms will return toward their normal free state position and position the abutments thereof behind the abutment surface of said ring of said vent tube to prevent reverse movement of the vent tube, said retainer cap having a vent opening aligned with said vent tube in said connector body and retaining said vent tube against forward movement when connected to said connector body, said retainer cap having a pair of laterally spaced rearwardly extending projections which are received between said wall surfaces of said vent tube cavity and said lock arms if the vent tube has been properly connected to the connector body to prevent deflection of the lock arms, said projections on said retainer cap being engageable with said lock arms at their forward ends if the lock arms are still deflected as a result of the engagement between the ring of the vent tube and the abutments of the lock arms.

2. An electrical connector assembly for a wiring harness which is adapted to be connected to a header connector on a printed board contained in a housing having an opening through which the electrical connector assembly extends, the electrical connector assembly comprising a plastic connector body having forward and rearward ends and a plurality of through cavities for receiving metal terminals connected to conductor wires and with the terminals being positioned adjacent the forward end of the connector body, a retainer cap connected to the connector body and extending over the forward end thereof for retaining said metal terminals against forward movement, and a vent tube extending through a cavity in the connector body for venting the housing interior containing the printed circuit board to ambient atmosphere, the improvement being that the vent tube has a radially outwardly extending ring of a given diameter adjacent its forward end which defines a radially extending abutment facing rearwardly thereof and said vent tube cavity of said connector body is defined by spaced wall surfaces which face each other, a pair of spaced, deflectable cantilever lock arms integral at one end with the wall surfaces and each having an inwardly extending abutment defining a forwardly facing abutment surface adjacent its forward free end, said abutments, when the arms are in their free state position, being spaced apart a distance which is less than the given diameter of said ring of said vent tube, said ring of said vent tube causing said lock arms to be deflected away from their normal free state position and each other when the vent tube is inserted into the connector body from its rearward end to its forward end until the ring clears the abutments on said lock arms whereupon the lock arms will return toward their normal free state position and position the abutments thereof behind the abutment surface of said ring of said vent tube to prevent reverse movement of the vent tube, said retainer cap having a vent opening aligned with said vent tube in said connector body and retaining said vent tube against forward movement when connected to said connector body, said retainer cap having a pair of laterally spaced rearwardly extending projections which are freely received between said wall surfaces of said vent tube cavity and said lock arms if the vent tube has been properly connected to the connector body to prevent deflection of the lock arms and reverse movement of the vent tube, said projections on said retainer cap being engageable with said lock arms at their forward ends if the lock arms are still deflected away from each other as a result of the engagement between the ring of the vent tube and the abutments of the lock arms.

3. An electrical connector assembly for a wiring harness which is adapted to be connected to a header connector on a printed board contained in a housing having an opening through which the electrical connector assembly extends, the electrical connector assembly comprising a plastic connector body having forward and rearward ends, a plurality of through cavities for receiving metal terminals connected to conductor wires, and a deflectable cantilever arm adjacent each cavity containing a metal terminal which is deflected by a radial land on the terminal when the latter is inserted into the cavity and which locks behind the radial land on the terminal to prevent reverse movement of the terminal, said terminals being positioned adjacent the forward end of the connector body, a retainer cap connected to the connector body and extending over the forward end thereof for retaining said metal terminals against forward movement and for assuring that all of the terminals have been properly connected by sliding over the cantilever arms, and a vent tube extending through a cavity in the connector body for venting the housing interior containing the printed circuit board to ambient atmosphere, the improvement being that the vent tube has a radially outwardly extending ring of a given diameter adjacent its forward end which defines a radially extending abutment facing rearwardly thereof and said connector body has the cavity for the vent tube defined by spaced wall surfaces which face each other, a pair of spaced, deflectable second cantilever lock arms integral with the wall surfaces and each having an inwardly extending abutment defining a forwardly facing abutment surface, said abutments, when the second lock arms are in their free state position, being spaced apart a distance which is less than the given diameter of said ring of said vent tube, said ring of said vent tube causing said second lock arms to be deflected away from their normal free state position and each other when the vent tube is inserted into the connector body from its rearward end to its forward end until the ring clears the abutments on said second lock arms whereupon the second lock arms will return toward their normal free state position and position the abutments thereof behind the abutment surface of said ring of said vent tube to prevent reverse movement of the vent tube, said retainer cap having a vent opening aligned with said vent tube in said connector body and retaining said vent tube against forward movement when connected to said connector body, said retainer cap having a pair of laterally spaced rearwardly extending projections which are received between said wall surfaces of said cavity for the vent tube and said second lock arms if the vent tube has been properly connected to the connector body to prevent deflection of the second lock arms, said projections on said retainer cap being engageable with said second lock arms forward ends if said second lock arms are still deflected as a result of the engagement between the ring of the vent tube and the abutments of the second lock arms whereby said retainer cap both assures proper connection of the terminals to the connector body and proper connection of the vent tube to the connector body.

4. An electrical connector assembly as defined in claim 3, and wherein said connector assembly is adapted to be secured to an end wall of said housing for said printed circuit board by a threaded fastener.

5. An electrical connector as defined in claim 3, and including a cover which is slidably connected to the connector body adjacent its rearward end and which has an opening disposed transversely of said cavities in the connector body so that said vent tube and conductors have to be bent at right angles to pass through the opening in the cover so that strain relief is provided.

* * * * *